(No Model.)
J. H. DWYER.
APPARATUS FOR WORKING BUTTER.
No. 557,781. Patented Apr. 7, 1896.
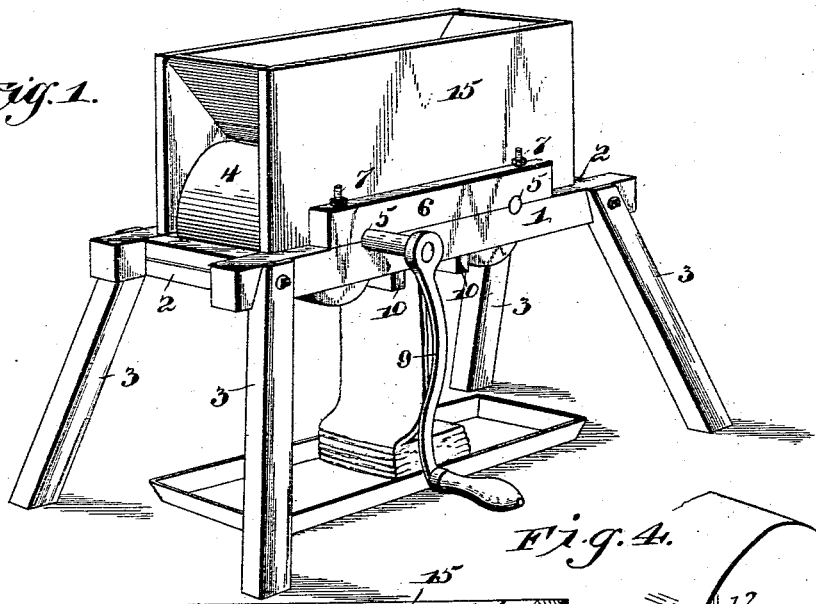
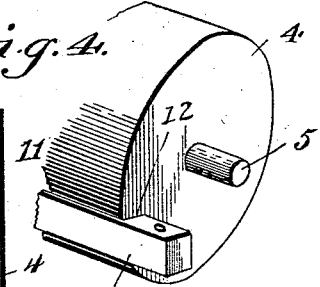
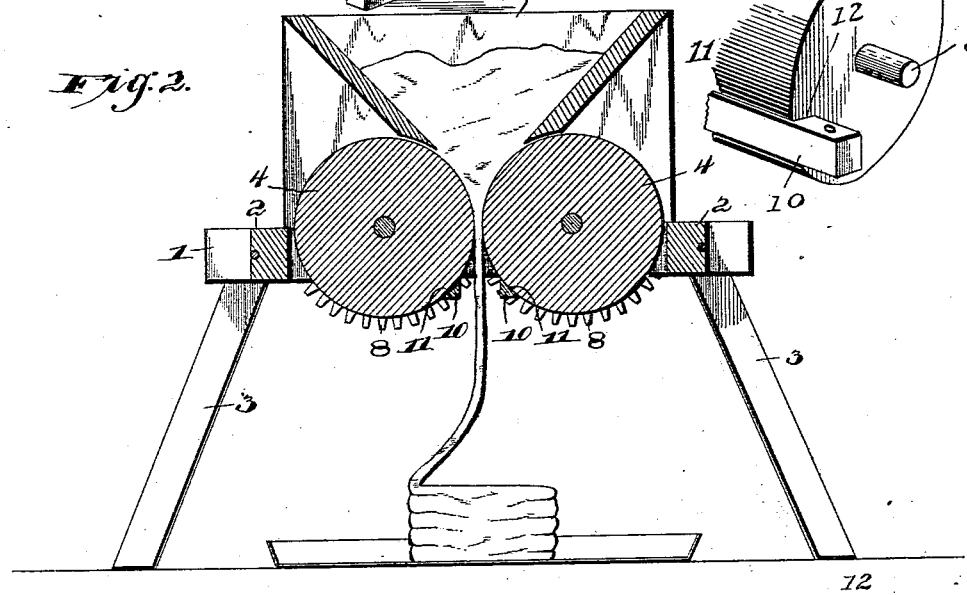
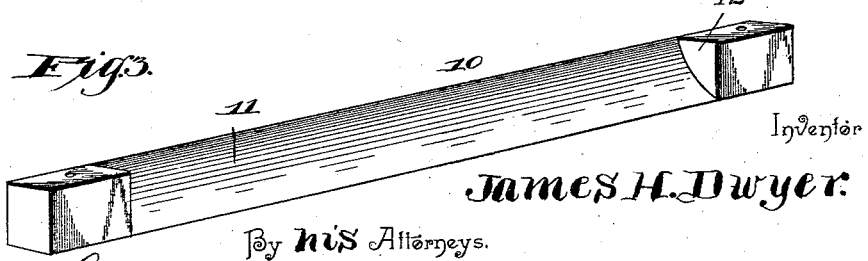
Witnesses
Wm. T. Doyle
Inventor
James H. Dwyer
By his Attorneys.
C. A. Snow & Co.

UNITED STATES PATENT OFFICE.

JAMES HENRY DWYER, OF HARRISONBURG, VIRGINIA.

APPARATUS FOR WORKING BUTTER.

SPECIFICATION forming part of Letters Patent No. 557,781, dated April 7, 1896.

Application filed May 5, 1894. Serial No. 510,187. (No model.)

*To all whom it may concern:*

Be it known that I, JAMES HENRY DWYER, a citizen of the United States, residing at Harrisonburg, in the county of Rockingham and State of Virginia, have invented a new and useful Apparatus for Working Butter, of which the following is a specification.

My invention relates to butter-working apparatus, and has for its object to provide a simple, inexpensive, and efficient device adapted for working butter by compression and designed especially for producing a homogeneous mixture of various grades, colors, or kinds of butter, means being employed for discharging the butter in a continuous flat sheet adapted to be folded in layers and preventing the butter from adhering to the surfaces of the rolls and from passing to the front surfaces to the ends thereof.

Further objects and advantages of this invention will appear in the following description, and the novel features thereof will be particularly pointed out in the appended claim.

In the drawings, Figure 1 is a perspective view of an apparatus embodying my invention. Fig. 2 is a central longitudinal section of the same. Fig. 3 is a detail view in perspective of one of the scrapers. Fig. 4 is a detail view in perspective of one end of one of the rollers and the adjacent scraper-bar.

Similar numerals of reference indicate corresponding parts in all the figures of the drawings.

1 designates side bars, and 2 connecting end bars, combining to form a horizontal frame, which is supported upon legs 3. Supported by this frame is a hopper 15, having vertical side and downwardly-convergent end walls, the end walls being separated at their lower extremities to form a passage or outlet for the contents of the hopper. Mounted in bearings 5 on the frame are the spindles of compressing-rolls 4, said rolls being arranged with their ends approximately in contact with the vertical side walls of the hopper below the lower extremities of the end walls and the contiguous surfaces of said rolls being separated the distance desired for the thickness of the sheet of butter. The spindles of the rolls are held in place in the bearings on the frame by means of caps or bearing-blocks 6, secured by bolts 7.

The spindle of one of the rolls is extended beyond its bearing at one end to receive a crank 9, and the rolls are connected for simultaneous rotation in opposite directions by means of gears 8.

The inclined ends of the hopper cause the butter as it descends to come in contact with the rolls at their inner descending sides, said rolls being caused to rotate with their inner or contiguous sides descending, in order to feed the butter therebetween and at the same time utilize gravity in the operation. The side walls of the hopper, which are extended below the lower extremities of the end walls, prevent the butter from passing downwardly between the ends of the rolls and the walls.

In connection with the above-described construction I employ scraper-bars 10, secured at their extremities to the frame below the points of nearest approach of the rolls to each other, and said bars are cut away and slightly concaved, as shown at 11, to conform to the curvature of the surfaces of the rolls and provide scraping edges, which bear approximately against the surfaces of the rolls, and thus prevent the butter from following said surfaces and adhering to the same.

Each bar is cut away between its extremities a distance equal to the length of the roll to which it is applied, thereby forming shoulders which bear approximately against the end surfaces of the roll, and thereby prevent the butter from passing beyond the extremities of the side or curved surfaces of the rolls and accumulating upon the ends thereof. This provision made in my apparatus for preventing the butter from working around the ends of the rolls is of special importance, for the reason that the cohesive property of butter is small, being proportionate to the temperature at which it is worked; but as the temperature is necessarily increased more or less by the compression of the rolls I have found it not only desirable, but necessary, to provide means for preventing the "creeping" of the butter around the ends of the rolls or the longitudinal movement thereof on the same. This limits the width of the sheet of butter to the interval between the shoulders on the scrapers. At this point it is to be observed that by reason of slightly concaving the cut-away portions of the scraper-bars 10 said bars are not only made to snugly fit and conform to the curvature of the surfaces of the rolls, but said bars are also provided with upper and lower sharp scraping edges, as clearly illustrated in Figs. 2 and 3 of the drawings. On account of providing the said scraper-bars 10 with two scraping edges it will be obvious that the said scraper-bars are reversible in character and may be attached to the frame, so as to present either of their sharp scraping edges upward. By constant wear the uppermost scraping edges of the scraper-bars necessarily become somewhat dull and will not positively keep the surfaces of the rolls clean, so therefore it is important to so construct the scraper-bars as to provide the same with two separate and independent scraping edges, either of which may be presented upward by simply reversing the said bars on the frame, as will be readily understood.

Inasmuch as the inner surfaces of the vertical side walls of the hopper are flush with the inner surfaces of the side bars 1 of the frame, the rollers are made of such a length that their extremities bear approximately against said flush surfaces, and the shoulders of the scrapers are flush with the inner surfaces of the side bars and the side walls.

Various changes in the form, proportion, and the minor details of construction may be resorted to without departing from the spirit or sacrificing any of the advantages of this invention.

Having described my invention, what I claim is—

In an apparatus for working butter, the combination of a supporting-frame, a stationary hopper arranged on the frame and provided with opposite downwardly-convergent end walls terminating short of each other at their lower ends to form an open bottom for the hopper, a pair of reversely and simultaneously rotating rollers mounted within the frame and slightly separated from each other, said rollers being disposed directly under the lower edges of said inclined end walls and forming the bottom of the hopper, reversible scraper-bars 10 arranged parallel with the axes of the rollers and against the adjacent lower sides thereof, said scraper-bars being cut away and concaved between their ends to snugly register against the surfaces of the rollers and to produce upper and lower sharp scraping edges, either of which edges may be presented upward, the cut-away portions of the said scraper-bars being equal in length with the rollers to form at the ends of the bars shoulders which overlap the ends of the rollers, substantially as set forth.

In testimony that I claim the foregoing as my own I have hereto affixed my signature in the presence of two witnesses.

JAMES HENRY DWYER.

Witnesses:
E. W. SULLIVAN,
S. COFFMAN.